UNITED STATES PATENT OFFICE.

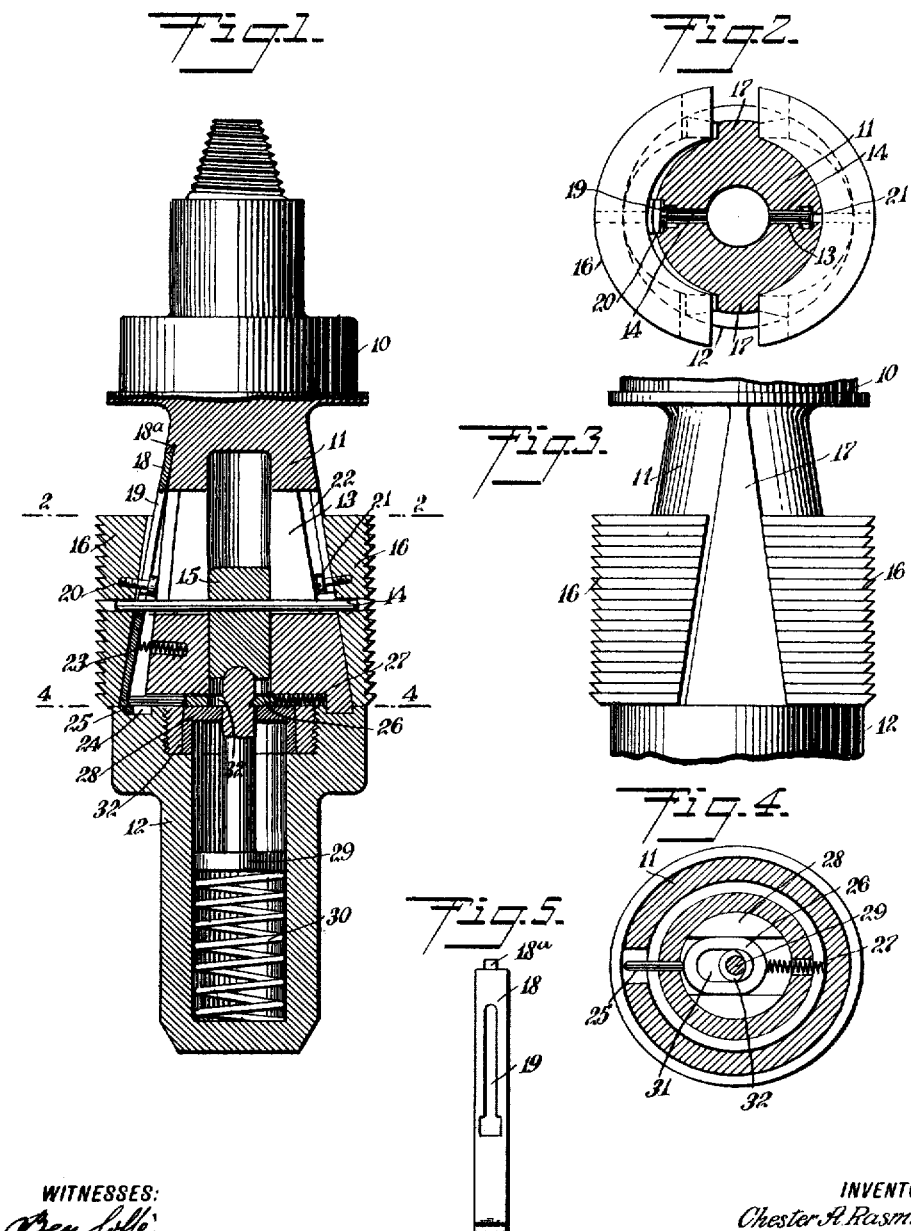

CHESTER ADOLPH RASMUSSEN, OF COALINGA, CALIFORNIA.

WELL-CASING SPEAR.

1,011,645.  Specification of Letters Patent.  Patented Dec. 12, 1911.

Application filed January 27, 1910. Serial No. 540,400.

*To all whom it may concern:*

Be it known that I, CHESTER A. RASMUSSEN, a citizen of the United States, and a resident of Coalinga, in the county of Fresno and State of California, have invented a new and Improved Well-Casing Spear, of which the following is a full, clear, and exact description.

The invention is an improvement in spears such as are used for removing casings from wells, and aims to effect the release of the spear from the casing should the latter refuse to yield under the pulling, by simply jarring the tool. To this end the slips or gripping jaws are slidable on the tapered body of the stock, as is the usual practice, and are normally forced toward the small portion of the body, with means to lock the slips or jaws in their lower operative positions, releasable by pressing the jaws inwardly.

Reference is to be had to the accompanying drawings forming a part of this specification, in which similar characters of reference indicate corresponding parts in all the views.

Figure 1 is a central vertical section of a well casing spear constructed in accordance with my invention; Fig. 2 is a cross-section of the same on the line 2—2 of Fig. 1; Fig. 3 is a fragmentary side view of the spear on an enlarged scale and at right-angles to the position of the spear as shown in Fig. 1; Fig. 4 is a cross-section on the line 4—4 of Fig. 1; and Fig. 5 is a face view of a carrier arm for one of the slips or gripping jaws.

The spear embodies in its construction a stock 10, having the usual threaded shank for detachably connecting it to the well rod, and provided with the customary tapered body portion 11, which is reduced and threaded at its lower end to receive a cup 12. The tapered body is of tubular construction and intermediate its length has a central cross-slot 13, longitudinally arranged, the cross-slot receiving a cross-pin 14, which is fixed to a plug or piston 15 slidable in the bore of the tapered body portion, with the end portions of the cross-pin loosely passing into openings formed in slips or gripping jaws 16, the latter being constructed of any suitable number of sections, two being shown, arranged at opposite sides of the tool and slidable on the tapered body portion, the inner faces of the gripping jaws being rounded and tapered in conformity with the body portion 11, with the outer gripping faces having the usual teeth and arranged substantially parallel to the longitudinal axis of the tool.

Between the gripping jaws the tapered body of the stock is provided at opposite sides with guide ribs 17, the ribs being tapered to present a bearing for the edges of the jaws in any position of the latter on the body, as clearly shown in Fig. 3. One of the gripping jaws is carried on an arm 18, the arm being let into the tapered body of the stock just above the cross-slot 13, where it is anchored or secured by a tab or projection 18ª, projecting from one end, and is provided with a longitudinal slot 19, through which a screw 20 passes, threaded into the jaw, the opposite jaw being similarly slidably retained on the tapered body by a screw 21, the head of which is arranged in grooves 22 formed in the opposite walls of the cross-slot 13. The arm 18, and consequently the gripping jaw which it carries, are normally forced outwardly from the tapered body by a spring 23, the arm being limited in its outward movement by the outer shoulder or wall of a slot 24, into which its lower end projects, the slot being formed in the upper face of the cup 12.

A pin 25 slidable in the tapered body is pressed by a latch 26 under the action of a spring 27 against the lower end of the arm 18, the latch being slidable in a way or groove, which is formed in the upper face of a tapered thimble 28, pressed into the reduced threaded portion of the body 11. Slidable in the cup 12 is a piston 29, normally forced upwardly by a spring 30, which is arranged under the piston at the bottom of the cup, the stem of the piston being slidable through the thimble 28 and passing through a slot 31 formed in the latch 26, the end of the piston being slightly rounded and received in a corresponding recess formed in the bottom of the plug 15, as shown in Fig. 1. The stem of the piston is provided with an annular groove 32, the upper wall of which is outwardly inclined, and the lower wall presenting a shoulder, which is engaged by the beveled inner edge of the latch 26, when the slips or gripping jaws are forced to the limit of their downward movement and rest on top of the cup 12, as shown in Fig. 1, the spring 30 being then compressed by the piston, which is locked by the latch, and the pin 25 pressing the arm 18 to the limit of its outward movement, holding the gripping jaw a substantial distance outwardly from the tapered body, as shown in Fig. 1. With the gripping jaws in this position, the spear is lowered into the well and passed into the casing which is to be withdrawn, the spear being easily entered and the jaws passed within the casing by reason of the guiding action afforded by the cup 12. As the gripping jaws pass into the casing and engage with the inner surface of the pipe, the outwardly-pressed gripping jaw is forced inwardly and through the medium of the pin 25 disengages the latch 26 from the piston 29. If it is found that the casing cannot be pulled from the well, the spear is released by simply giving it a jar, when the gripping jaws are forced to the upper and smaller portion of the tapered body under the action of the spring 30, the jaws being forced to move in unison in either direction by reason of the connecting cross-pin 14.

Having thus described my invention, I claim as new and desire to secure by Letters Patent:

1. In a well casing spear, a stock having a tapered body, gripping jaws slidable on the tapered body of the stock, a cup detachably connected to the lower end of the stock, a member slidable in the body of the stock, means attached to the member and operatively engaging the jaws and enforcing them to move in unison, a spring-pressed piston slidable in the cup and normally forcing the member upwardly, an arm by which one of said jaws is carried, connected at its upper end to the said body and movable toward and from the body, a latch arranged to lock the piston in a retracted position, and a pin arranged between the latch and the lower portion of said arm to disengage the latch from the piston when the jaw on the arm is forced inwardly.

2. In a well casing spear, a stock having a tapered body provided with a cross-slot longitudinally arranged, an arm secured at its upper end to the upper portion of the body and movable toward and from said body, said arm having limited outward movement at its lower end, gripping jaws, one of which is slidable on the arm and the other slidable at the opposite side of the body, a plug slidable in the body, having means operatively connecting it to the jaws and forcing the latter to move in unison, a cup extending from the lower end of the stock, a piston slidable in the cup and bearing on the plug, a latch slidable crosswise of the piston and arranged to lock it against upward movement when the spring is compressed, and a member arranged between the latch and the arm to force the latch from the piston.

3. In a well casing spear, a stock having a tapered body, gripping jaws slidably engaging the tapered body of the stock, spring pressed means for normally forcing one of said jaws outwardly, whereby it may be moved inwardly, spring pressed means for normally forcing said jaws toward the smaller portion of the body, a latch for normally holding said last-mentioned means in retracted position, and a member for forcing one of said gripping jaws outwardly from said body under the action of said latch when the latter is in locking engagement with said second-mentioned spring pressed means, said member also serving to operate the latch when the spring pressed jaw is moved inwardly.

4. In a well casing spear, a stock having downwardly and outwardly inclined faces, gripping jaws slidable on said faces, means for forcing one of said gripping jaws outwardly, whereby it may be moved inwardly, spring pressed mechanism operatively connecting said jaws together and normally tending to force them in an upward direction, a latch for restraining said spring pressed mechanism when all jaws are moved downwardly upon said faces, and a member disposed between the said movable jaw and said latch to disengage said latch when the jaw is forced inwardly.

5. In a well casing spear, a stock provided with a tapering body portion, gripping jaws slidably engaging said tapering body portion and movable apart, a member engaging one of said gripping jaws and normally forcing it outwardly, whereby it may be moved inwardly, a latch releasable by inward movement of the jaw thus forced outwardly, and spring mechanism normally restrained by said latch for the purpose of forcing said jaws from the larger portion of said body toward the smaller portion thereof.

6. In a well casing spear, a stock provided with a tapering body portion, gripping jaws slidably engaging the same, a member associated with one of said gripping jaws and normally forcing it outwardly, whereby it may be moved inwardly, a latch releasable by inward movement of the jaw thus forced outwardly, and spring mechanism normally restrained by said latch for forcing said jaws from the larger portion of said body toward the smaller portion thereof.

In testimony whereof I have signed my name to this specification in the presence of two subscribing witnesses.

CHESTER ADOLPH RASMUSSEN.

Witnesses:
JOHN L. LARSON,
FRANK M. TAGGATT.

Copies of this patent may be obtained for five cents each, by addressing the "Commissioner of Patents, Washington, D. C."